United States Patent Office 2,860,967
Patented Nov. 18, 1958

2,860,967

PROCESSING OF SULFIDIC NICKEL-CONTAINING MATERIALS

Leo Schlecht and Georg Trageser, Ludwigshafen (Rhine), Germany, assignors to Badische Anilin- & Soda-Fabrik Aktiengesellschaft, Ludwigshafen (Rhine), Germany No Drawing. Application January 28, 1954
Serial No. 406,897

Claims priority, application Germany February 3, 1953

6 Claims. (Cl. 75—103)

This invention relates to improvements in the processing of sulfidic nickel-containing materials.

Recently it has been proposed to work up sulfidic nickel-containing materials, as for example sulfidic nickel-copper ores, by treating them with aqueous ammonia solution in the presence of oxygen and recovering from the solution the nickel and copper, and any cobalt present, which have passed into solution. Such sulfidic nickel-containing raw materials usually contain considerable amounts of iron in the form of iron sulfide. The sulfur of this iron sulfide is at least partly oxidised to sulfate by the action of the oxygen during the ammoniacal treatment, so that considerable amounts of ammonium sulfate are necessarily obtained. At the same time a sludge of basic iron salt is formed which renders difficult the separation of the residue from the ammoniacal nickel salt solution and moreover persistently retains ammonia so that waste of ammonia readily occurs. Furthermore the said sludge can only be exploited with difficulty, for example for the recovery of metallic iron, by reason of its sulfur content which is usually too high.

We have now found that the said drawbacks can be avoided by first subjecting the sulfidic raw material which contains, in addition to iron, at least one of the metals copper, nickel and cobalt, in particular sulfidic copper or copper-nickel ores and concentrates, to a roasting to a maximum sulfur content approximately sufficient for combining with the copper and/or nickel and/or cobalt, then subjecting the roasted material to a treatment with a solution of ammonia in the presence of oxidising agents, in particular oxygen, to dissolve the non-iron metals, and separating the residue consisting mainly of iron oxide from the solution.

The said roasting pretreatment of the sulfidic material, as for example a flotation concentrate from poor sulfidic nickel-copper ore, is preferably effected by the turbulent layer-roasting method. Turbulent layer roasting is described in detail in the article "FluoSolids Roasting of Sulphides" by T. B. Counselman, appearing in Mining Congress Journal, March 1951. The solid particles of concentrate are kept in a turbulent dense phase or fluidized state, similar to a boiling liquid, by a fluidizing gas such as air which also supplies oxygen for roasting. Fresh concentrate is continuously added to the turbulent layer or fluidized bed while the bulk of the reacted solids overflow into a discharge pipe, some entrained fine particles being recovered from the effluent gases by any conventional means. One advantage of turbulent layer roasting is that it permits a very close control of the sulfur content. It is known that sulfur is at first rapidly oxidised and that only the last traces thereof oxidise more slowly; since in the present case the last traces do not have to be oxidised, the partial roasting requires only a relatively short time.

Leaching of the roasted material may be carried out in the usual way, preferably while it is being moved in the ammoniacal solution. It is possible to work with or without the addition of ammonium salts, such as ammonium carbonate. Oxygen or air are preferably used for the oxidation.

To increase the rate of the leaching, increased pressure may be used, in which case the necessary precautions must be taken to prevent ammonia-air explosions.

In many cases it may be advantageous in order to accelerate the ammoniacal leaching to subject the partly roasted material to a further roasting of sulfatising and/or chloridising character at lower temperatures. In this way the nickel, copper and cobalt are converted into chlorides or sulfates and thus become considerably more easily soluble in ammonia. In this case the use of air or oxygen or other oxidising agent during the leaching can be dispensed with and the safety of the operation thereby increased.

The separation of the ammoniacal metal salt solution from the residue containing iron oxide offers no particular difficulty because the iron oxide has been formed at high temperature and therefore is not so finely divided and slimy as the basic iron salts or iron hydroxide formed in the ammoniacal solution in the prior methods. The residue remaining in the process according to the invention can also be more readily obtained free from ammonia than hitherto and may be used as a high quality iron oxide for pig iron production. A further advantage is that by the new process the bulk of the sulfur is not obtained, as hitherto, in the form of sulfate but in the form of sulfur dioxide which can be used as such, for example in the pulp industry, or worked up into sulfuric acid which can be used for many purposes.

The following example will further illustrate this invention but the invention is not restricted to this example.

*Example*

A sulfidic nickel-copper ore containing 5.6% of nickel, 2.9% of copper, 0.17% of cobalt, 40.1% of iron and 27.6% of sulfur is roasted to such an extent that the sulfur content has been reduced to about 5% and the bulk of the iron sulfide has been converted into iron oxide. The roasted material is then treated with aqueous ammonia and air until the nickel, copper ad cobalt have passed into solution. Most of the iron oxide residue settles out spontaneously. The remainder is filtered off. The residue consists practically of sulfur-free iron oxide and can readily be worked up to metallic iron by reduction.

We claim:

1. A process for working up a sulfidic raw material containing, in addition to iron, at least one non-iron metal of the group consisting of copper, nickel and cobalt which comprises first partially oxidising roasting the raw material to an adjusted sulfur content approximately sufficient for combining with the amount of the non-iron metal present, then subjecting the partially roasted material having said adjusted sulfur content to a treatment with a solution of ammonia in the presence of an oxidising agent to dissolve the non-iron metals, and separating the residue consisting mainly of a sulfur-free iron oxide.

2. A process for working up sulfidic raw material containing, in addition to iron, at least one non-iron metal of the group consisting of copper, nickel and cobalt which comprises first partially oxidising roasting the raw material to an adjusted sulfur content approximately sufficient for combining with the amount of the non-iron metal present, then subjecting the partially roasted material having said adjusted sulfur content to a treatment with an aqueous solution of ammonia in the presence of an oxidising agent to dissolve the non-iron metals, and separating the residue consisting mainly of a sulfur-free iron oxide.

3. A process for working up a sulfidic raw material containing, in addition to iron, at least one non-iron metal of the group consisting of copper, nickel and cobalt which comprises first partially oxidising roasting the raw material to an adjusted sulfur content approximately sufficient for combining with the amount of the non-iron metal present, then subjecting the partially roasted material having said adjusted sulfur content to a treatment with an aqueous solution of ammonia in the presence of an oxygen-containing gas to dissolve the non-iron metals, and separating the residue consisting mainly of a sulfur-free iron oxide.

4. A process for working up a sulfidic raw material containing, in addition to iron, at least one non-iron metal of the group consisting of copper, nickel and cobalt which comprises first partially oxidising roasting the raw material to an adjusted sulfur content approximately sufficient for combining with the amount of the non-iron metal present, then subjecting the partially roasted material having said adjusted sulfur content to a treatment with an aqueous solution of ammonia and ammonium carbonate in the presence of an oxygen-containing gas to dissolve the non-iron metals, and separating the residue consisting mainly of a sulfur-free iron oxide.

5. A process of recovering metals from a sulfidic raw material containing, in addition to iron, at least one non-iron metal of the group consisting of copper, nickel and cobalt, which comprises: first partially oxidising roasting the raw material at high temperature by the turbulent-layer roasting method to an adjusted sulfur content approximately sufficient for combining with the non-iron metal present; then leaching the partially roasted material having said adjusted sulfur content with an aqueous ammonia solution in the presence of an oxygen-containing gas to dissolve the non-iron metals; and separating the residue consisting predominantly of sulfur-free iron oxide.

6. A process as defined in claim 5 wherein the leaching step is carried out under an increased pressure.

References Cited in the file of this patent

UNITED STATES PATENTS

| | | |
|---|---|---|
| 1,098,443 | Hybinette | June 2, 1914 |
| 1,833,683 | Meyer | Nov. 24, 1931 |
| 2,094,277 | Mitchell | Sept. 28, 1937 |
| 2,576,314 | Forward | Nov. 27, 1951 |
| 2,726,934 | Forward et al. | Dec. 13, 1955 |

FOREIGN PATENTS

| | | |
|---|---|---|
| 28,231 | Australia | Aug. 4, 1930 |